United States Patent
Georges

(10) Patent No.: US 11,074,249 B2
(45) Date of Patent: Jul. 27, 2021

(54) DYNAMIC ADAPTATION OF LANGUAGE UNDERSTANDING SYSTEMS TO ACOUSTIC ENVIRONMENTS

(71) Applicant: Intel Corporation, Santa Clara, CA (US)

(72) Inventor: Munir Nikolai Alexander Georges, Kehl (DE)

(73) Assignee: Intel Corporation, Santa Clara, CA (US)

( * ) Notice: Subject to any disclaimer, the term of this patent is extended or adjusted under 35 U.S.C. 154(b) by 171 days.

(21) Appl. No.: 15/949,527

(22) Filed: Apr. 10, 2018

(65) Prior Publication Data
US 2019/0043497 A1 Feb. 7, 2019

(51) Int. Cl.
*G06F 16/242* (2019.01)
*G10L 15/22* (2006.01)
(Continued)

(52) U.S. Cl.
CPC ........ *G06F 16/243* (2019.01); *G10L 15/1807* (2013.01); *G10L 15/1815* (2013.01);
(Continued)

(58) Field of Classification Search
CPC . G10L 15/22; G10L 15/1807; G10L 15/1815; G10L 15/26; G10L 25/21;
(Continued)

(56) References Cited

U.S. PATENT DOCUMENTS 10,032,451 B1 * 7/2018 Mamkina ................ G10L 15/26
10,515,625 B1 * 12/2019 Metallinou ............. G10L 15/26
(Continued)

OTHER PUBLICATIONS

Kuansan Wang, "Semantics synchronous understanding for robust spoken language applications," 2003 IEEE Workshop on Automatic Speech Recognition and Understanding (IEEE Cat. No.03EX721), St Thomas, VI, USA, 2003, pp. 640-645, doi: 10.1109/ASRU.2003.1318515. (Year: 2003).*
(Continued)

*Primary Examiner* — Michelle M Koeth
(74) *Attorney, Agent, or Firm* — Hanley, Flight & Zimmerman, LLC

(57) ABSTRACT

Techniques are provided for dynamic adaptation of language understanding systems to acoustic environments. A methodology implementing the techniques according to an embodiment includes generating a trigger in response to recognition of a wake-on-voice key-phrase in or prior to an audio stream. The trigger serves to switch processing modes from an adaptation mode to a query recognition mode. The method further includes performing automatic speech recognition on the audio stream during the query recognition mode, to recognize an in-domain query. The method further includes applying both a static language understanding classifier and a dynamic language understanding classifier to the recognized in-domain query. The static language understanding classifier employs a static semantic model and the dynamic language understanding classifier employs a dynamic semantic model. The method further includes determining an intent associated with the recognized in-domain query based on results of the static language understanding classifier and the dynamic language understanding classifier.

22 Claims, 7 Drawing Sheets

(51) Int. Cl.
*G10L 25/90* (2013.01)
*G10L 25/84* (2013.01)
*G10L 15/18* (2013.01)
*G10L 15/08* (2006.01)
*G10L 25/21* (2013.01)
*G10L 15/26* (2006.01)
*G10L 25/48* (2013.01)

(52) U.S. Cl.
CPC .............. *G10L 15/22* (2013.01); *G10L 25/21* (2013.01); *G10L 25/84* (2013.01); *G10L 25/90* (2013.01); *G10L 15/26* (2013.01); *G10L 25/48* (2013.01); *G10L 2015/088* (2013.01); *G10L 2015/223* (2013.01)

(58) Field of Classification Search
CPC ......... G10L 25/84; G10L 25/90; G10L 25/48; G10L 2015/088; G10L 2015/223; G06F 16/243
See application file for complete search history.

(56) References Cited

U.S. PATENT DOCUMENTS

| | | | |
|---|---|---|---|
| 2005/0229226 A1* | 10/2005 | Relan | H04N 21/4334 725/114 |
| 2014/0039888 A1* | 2/2014 | Taubman | G10L 15/183 704/235 |
| 2017/0270919 A1* | 9/2017 | Parthasarathi | G10L 15/02 |
| 2019/0214019 A1* | 7/2019 | White | G10L 17/00 |

OTHER PUBLICATIONS

Georges et al., "Accurate client-server based speech recognition keeping personal data on the client," 2014 IEEE International Conference on Acoustics, Speech and Signal Processing (ICASSP), Florence, 2014, pp. 3271-3275 (Year: 2014).*

Maleki et al., "Parallel Stochastic Gradient Descent with Sound Combiners,"arXiv: 1705.08030, May 22, 2017 (Year: 2017).*

* cited by examiner

DYNAMIC ADAPTATION OF LANGUAGE UNDERSTANDING SYSTEMS TO ACOUSTIC ENVIRONMENTS

BACKGROUND

Spoken language understanding systems generally translate audio voice queries into machine-understandable user intentions, which can then be acted upon by the given computing platform. These systems use models for speech recognition and language understanding. The models are typically trained on data that is simulated or collected from representative acoustic environments. The choice of acoustic environment for training can have a significant impact on the accuracy of the language understanding system. Unfortunately, this training approach suffers from a number of shortcomings. First, it assumes that the acoustic environment used for training will match the acoustic environment during operation. Second, it assumes that the acoustic environment during operation is stable. In real world usage, however, these assumptions are often invalid, resulting in the generation of sub-optimal models. Attempts to generate simulated model training data that can cover all use cases would be time-consuming, costly, and impractical. As a consequence, systems are trained on the relatively limited training data that is available. Thus, language understanding accuracy tends to decrease when the acoustic environment varies beyond the scope of the training model used, resulting in an unsatisfactory user experience.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts.

Figure 1:
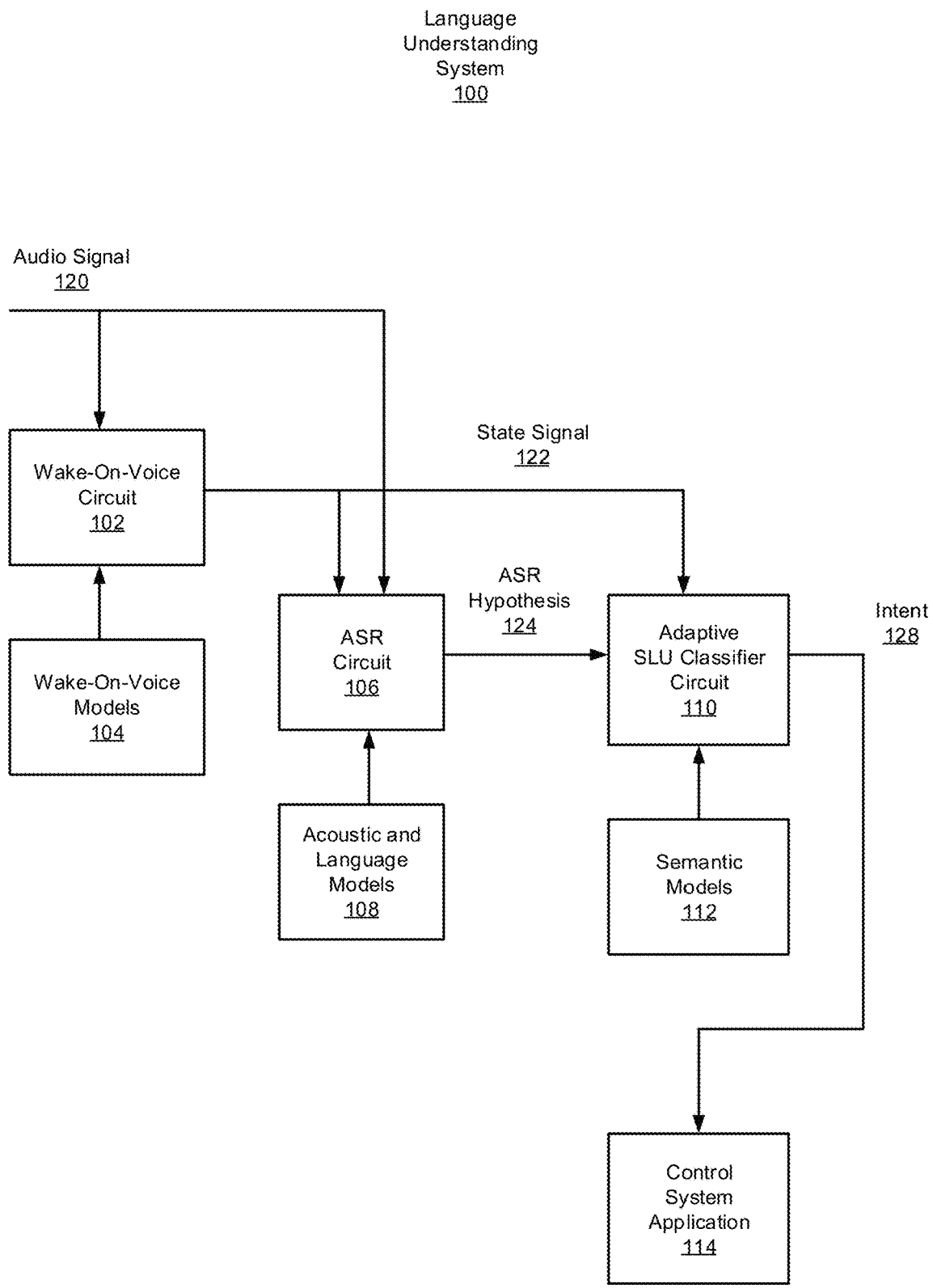
FIG. 1 is a block diagram of a dynamically adaptive language understanding system, configured in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Generally, this disclosure provides techniques for dynamic adaptation of language understanding systems to changing acoustic environments. Language understanding systems perform speech recognition, to transform an audio signal into a sequence of recognized words, followed by an estimation of the intent of the speaker based on those recognized words. The acoustic environment, however, can include time varying background noise and other utterances/conversations that are not directed to the language understanding system and which can adversely impact the performance of the language understanding system to respond to actual queries from a speaker or user of the system. The disclosed techniques employ a combination of static and dynamic classifiers, the outputs of which are interpolated, to estimate the intention of the user based on a received audio speech signal. The static classifier employs a pre-trained semantic model, while the dynamic classifier employs an adaptive semantic model which may be continuously or periodically updated based on hypotheses generated by a speech recognition engine during operation of the system. The recognition hypotheses can be associated with out-of-domain utterances and background noise, as well as in-domain user queries. By adaptively updating the semantic model, the ability of the dynamic classifier, and thus the language understanding system, to distinguish out-of-domain data from in-domain queries in changing environments is improved.

The disclosed techniques can be implemented, for example, in a computing system or a software product executable or otherwise controllable by such systems, although other embodiments will be apparent. The system or product is configured to dynamically adapt the semantic models used by a language understanding system based on changes in the acoustic environment. In accordance with an embodiment, a methodology to implement these techniques includes generating a trigger in response to recognition of a wake-on-voice key-phrase in an audio stream. The trigger serves to switch the processing mode of the system from an adaptation mode to a query recognition mode. In the query recognition mode automatic speech recognition is performed on the audio stream to recognize an in-domain query (e.g., a command to direct action taken by the language understanding system, or question to be answered by the language understanding system). The method further includes applying both a static language understanding classifier and a dynamic language understanding classifier to the recognized in-domain query. The static language understanding classifier employs a static semantic model and the dynamic language understanding classifier employs a dynamic semantic model. The method further includes interpolating results of the static language understanding classifier with results of the dynamic language understanding classifier to determine an intent associated with the recognized in-domain query. Additionally, automatic speech recognition is performed on the audio stream during the adaptation mode, to generate hypotheses for audio events associated with a rejection class that includes audio associated with out-of-domain utterances and background noise. These hypotheses are used to update the dynamic semantic model. In some embodiments, the dynamic semantic model may also be updated based on the recognized in-domain queries.

As will be appreciated, the techniques described herein may allow for an improved user experience with a language understanding system, by providing more accurate recognition and understanding of the intent of the user speech, compared to existing methods that rely on model training based on predefined acoustic environments. The disclosed techniques can be implemented on a broad range of platforms including laptops, tablets, smart phones, workstations, video conferencing systems, gaming systems, smart home control systems, and low-power embedded DSP/CPU systems or devices. Additionally, in some embodiments, the data may be processed entirely on a local platform to meet privacy and security requirements/constraints. These techniques may further be implemented in hardware or software or a combination thereof.

FIG. 1 is a block diagram of a dynamically adaptive language understanding system 100, configured in accordance with certain embodiments of the present disclosure. The language understanding system 100 is shown to include a wake-on-voice (WOV) circuit 102, an automatic speech recognition (ASR) circuit 106, an adaptive speech language understanding (SLU) classifier circuit 110, and a control system application 114. Also shown are WOV models 104 (for use by the WOV circuit 102), acoustic and language models 108 (for use by the ASR circuit 106), and semantic models 112 (for use by the adaptive SLU classifier circuit 110), as will be explained in greater detail below. In some embodiments, the language understanding system 100, and one or more input/output elements, may be hosted on a computing or communications platform, as described in greater detail in connection with FIG. 7 below.

At a high level, the language understanding system 100 is configured to receive an audio signal 120 that includes voice queries from a user of the system (also referred to as "in-domain" data), and may also include background noise and other voices or conversational utterances (also referred to as "out-of-domain" data). The audio signal 120 may be provided by a microphone or an array of microphones (e.g., configured for beamforming), or any other suitable audio capture device.

The WOV circuit 102 is configured to detect a key-phrase such as, for example, "hello computer," which triggers the ASR circuit 106, through state signal 122, to recognize the voice query, for example, "hello computer, turn on the lights." State signal 122 also controls the semantic model adaptation process by switching processing modes, as will be described in greater detail below. The control system application 114 is configured to perform an action based on the intention 128 of the speaker, as estimated by adaptive SLU classifier circuit 110 based on the hypotheses 124 generated by ASR circuit 106. For example, the command "lock doors" may result in an audio confirmation from the system such as "locking doors now," accompanied by the action of locking the doors through appropriate control system hardware.

In some embodiments, other suitable techniques can be used to generate the trigger and state signal, such as, for example, detection that the user is looking at the device, detection that the user has picked up the device, or detection that the user has pressed a button (e.g., a push-to-talk button), etc. The detection of any of these actions, or other suitable events, may be considered as a wake-up event equivalent to the recognition of a wake-on-voice key phrase, for purposes of the embodiments described herein.

Figure 2:
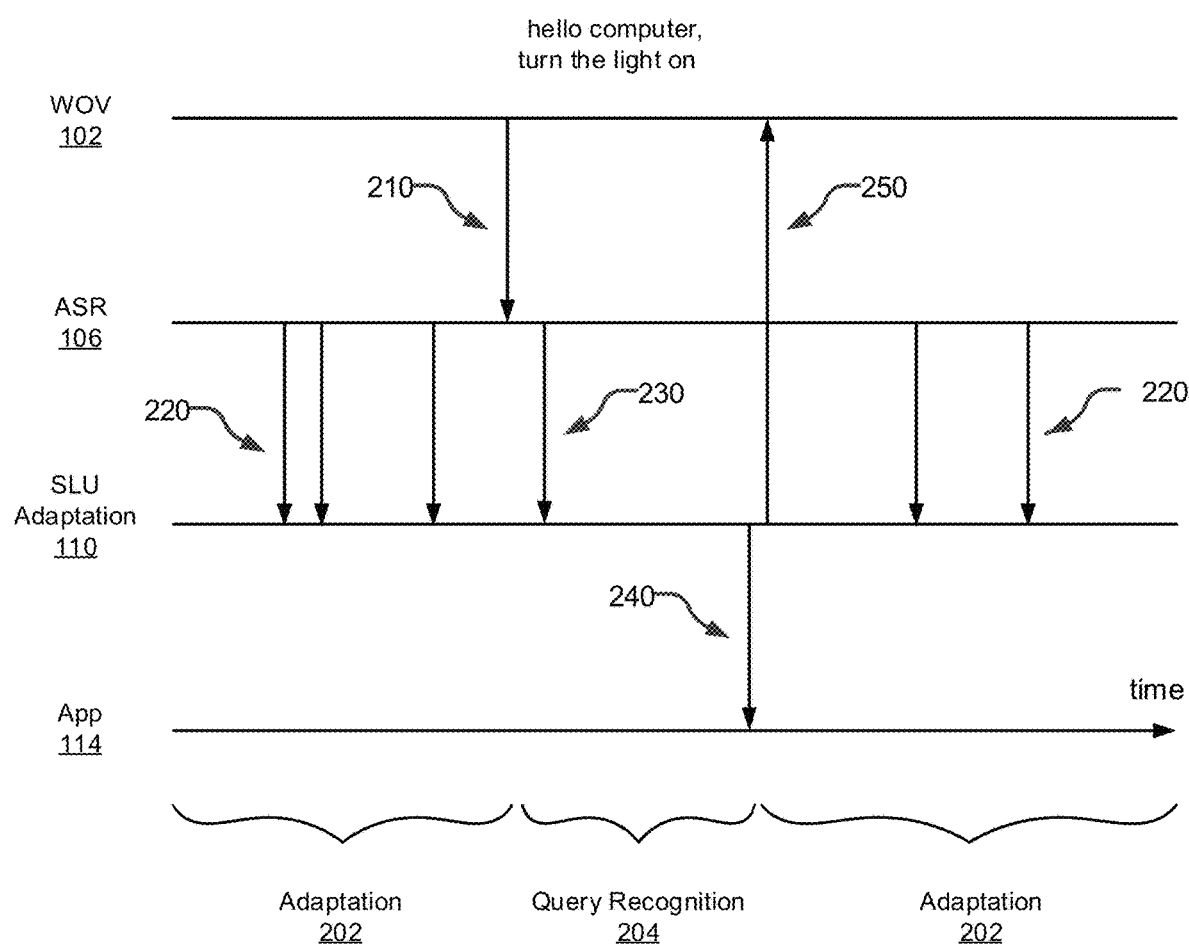
FIG. 2 is a flow diagram illustrating an implementation of a dynamically adaptive language understanding system configured in accordance with certain embodiments of the present disclosure.

FIG. 2 is a flow diagram 200 illustrating events and control flow of a dynamically adaptive language understanding system configured in accordance with certain embodiments of the present disclosure. Initially, the system is shown to be in an adaptation phase 202. During adaptation mode, the ASR circuit 106 generate hypotheses 220 for audio events associated with a rejection class (e.g., background noise and out-of-domain utterances). These hypotheses are passed to the adaptive SLU classifier circuit 110 for use in updating the dynamic semantic models 112b, as will be explained in greater detail below. When a WOV key-phrase (e.g., "hello computer," or some other chosen key-phrase) is detected by the WOV circuit 102, a trigger 210 is sent to the ASR 106 and the system transitions to query recognition mode 204. The ASR then recognizes the in-domain query (e.g., "turn the light on") and passes this recognition 230 to the adaptive SLU classifier circuit 110 to determine an intent associated with the recognized in-domain query. The intent 240 is then passed to the control system application 114 to perform an action associated with the intent. After the intent is determined, a trigger 250 is sent back to the WOV circuit to restart the search for another key-phrase, and the system transitions back to adaptation mode 202.

In some embodiments, the adaptation mode may be restricted to selected time periods based on a power budget of the system or hosting platform. For example, adaptation may be set to occur only once every N seconds or only before/after a voice query recognition. In some embodiments, adaptation may be triggered by the detection of a change in the acoustic environment, for example the television is turned off and cooking/kitchen sounds begin, or by some other event detection. ASR results may be stored in memory until such time as needed, for example when the adaptation update is triggered or scheduled to be performed.

Figure 3:
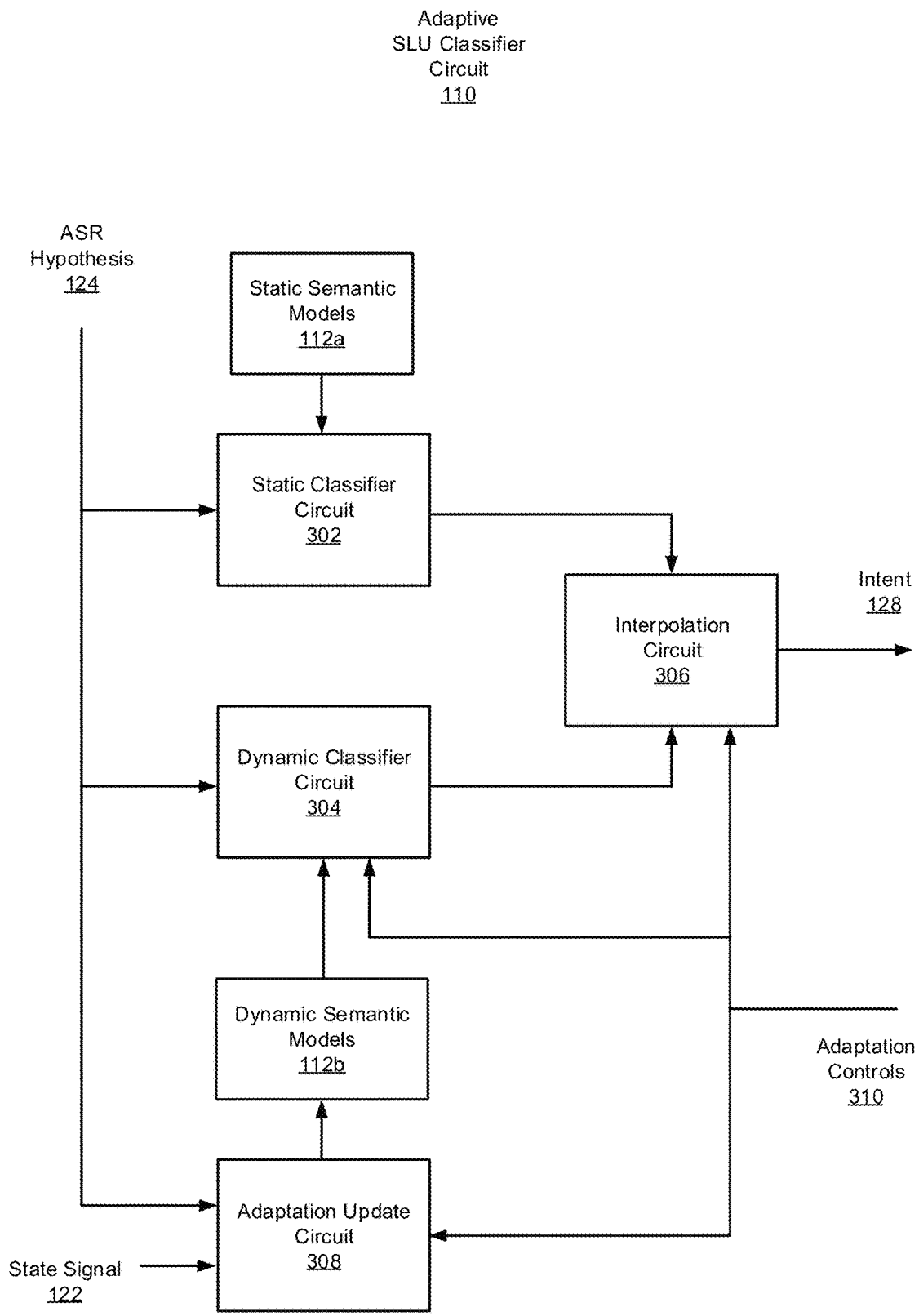
FIG. 3 is a block diagram of an adaptive spoken language understanding classifier circuit, configured in accordance with certain embodiments of the present disclosure.

FIG. 3 is a block diagram of an adaptive spoken language understanding classifier circuit 110, configured in accordance with certain embodiments of the present disclosure. The adaptive SLU classifier circuit 110 is shown to include a static language understanding classifier circuit 302, a dynamic language understanding classifier circuit 304, an interpolation circuit 306, and an adaptation update circuit 308.

The static language understanding classifier circuit 302 is configured to generate a first estimate of intent based on the recognized in-domain query, and associated hypothesis 124. The static language understanding classifier circuit 302 employs the static semantic models 112a, and is pre-trained, for example before provisioning of the system to the user.

The dynamic language understanding classifier circuit 304 is configured to generate a second estimate of intent based on the recognized in-domain query, and associated hypothesis 124. The dynamic language understanding classifier circuit 304 employs the dynamic semantic models 112b, which are initialized with pre-trained or randomized values and then updated during operation as described below. In some embodiments, the static and dynamic classifier circuits may be implemented as deep neural networks, recurrent neural networks, conditioned random fields, support vector machines, or other suitable mechanisms in light of the present disclosure.

The classifier circuits operate on feature vectors associated with the ASR provided hypotheses. In some embodiments, the feature vectors may include Bag of Words features. The dynamic language understanding classifier circuit 304 may also operate on acoustic confidence measures provided by the ASR. Although speech recognizers are typically tasked to find the best recognized search path among all possibilities, ASR circuit 106 may be configured to generate acoustic confidences by comparing the best path in the search space to all other possible paths to calculate the probability that a word has been spoken. In some embodiments, the probability may be approximated by limiting the search space to a subset of the best results, to improve efficiency.

In some embodiments, the acoustic confidence measurements may also include additional information including, for example, energy-level, pitch-level, and other prosodic information (e.g., tone, stress, rhythm, etc.) that is typically not made visible in the features provided by conventional speech recognizers. These types of acoustic confidence measures are typically available only at run-time and thus cannot generally be used in provisioning of pre-trained models for static classifiers.

The interpolation circuit 306 is configured to determine an intent 128 associated with the recognized in-domain query based on a combination of the first estimate of intent and the second estimate of intent. In some embodiments, the intent 128 may be calculated using linear interpolation according to the following equation:

$$P(\text{intent}|\text{query}) = \lambda P_1(\text{intent}|\text{query}) + (1 \lambda)P_2(\text{intent}|\text{query})$$

The influence weight $\lambda$ can be adjusted to provide greater emphasis to either the static classifier term $P_1$ or the adaptive classifier term $P_2$, and may be used to avoid over-fitting or to reset the system. In some embodiments, the interpolation circuit 306 may employ a log-linear interpolation or class-constrained interpolation, which can limit the adaptation/update affect to outlier cases such as high-noise environments or semantic classes.

In some embodiments, the interpolation circuit is further configured to switch the processing mode from the query recognition mode back to the adaptation mode in response to determining the intent associated with the recognized query.

The adaptation update circuit 308 is configured to update the dynamic semantic models 112b based on the ASR hypotheses 124 associated with audio events in the rejection class and, in some embodiments, hypotheses associated with recognized in-domain queries. In some embodiments, the hypotheses may include word probabilities and one or more of an acoustic confidence level, an energy level, a pitch level, and prosodic information. In some embodiments, the semantic models are dynamically updated using a stochastic gradient descent optimization, although other known techniques may be employed in light of the present disclosure. The adaptation update may be configured to automatically balance the learning of out-of-domain (rejection labeled) data with in-domain data by using the recently recognized voice queries or by using simulated in-domain data provided by an in-domain generation model. In-domain data used for this purpose should generally have large cross-entropy loss values to avoid confusion between in-domain data that may be similar to out-of-domain data. A regularization process is not required, but may be used in some embodiments to smooth the adaptation update process.

In some embodiments, adaptation controls 310 may be provided, for example from the control system application 114, another application, or any other suitable source. These controls may include the influence weight $\lambda$, described above, and a learning rate R configured to weight the impact of each adaptation update. For example, a lower value of R is used if a slowly changing environment is expected, while a higher value of R is used if a fast-changing environment is expected. A value of R=0 would result in no updates to the model. Additionally, in some embodiments, feedback may be provided to the control system application 114 (or other suitable application) to indicate whether the language understanding system is in adaptation mode 202 or query recognition mode 204, or, equivalently, whether the WOV circuit 102 is listening for a key-phrase or waiting to be re-triggered.

In some embodiments, the adaptation update circuit 308 may be reset by randomizing the neural network weights to redistribute the network output layer and a relatively equal manner, which would nullify the impact of the dynamic classifier output on the interpolation result.

Figure 4:
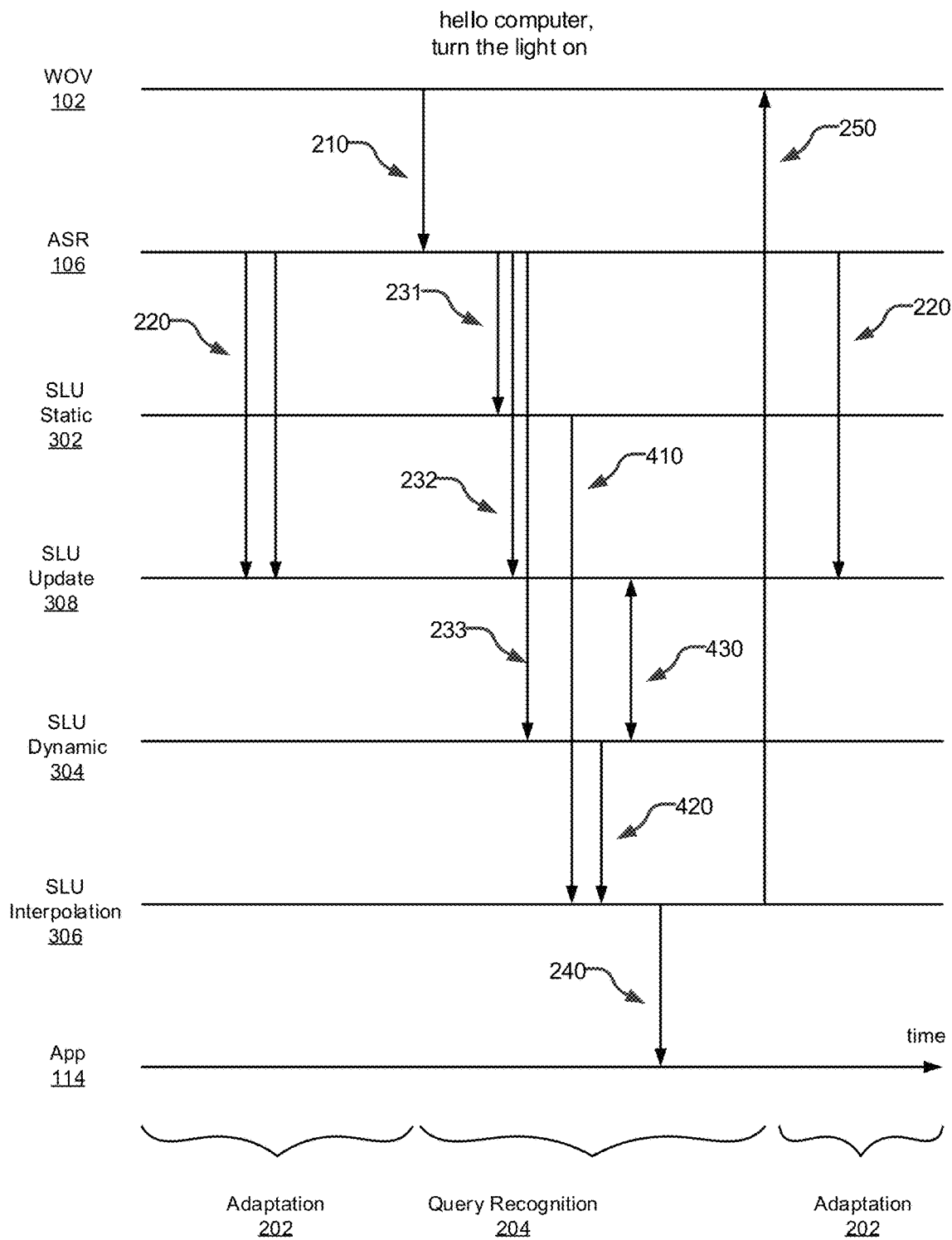
FIG. 4 is a more detailed flow diagram illustrating an implementation of a dynamically adaptive language understanding system configured in accordance with certain embodiments of the present disclosure.

FIG. 4 is a more detailed flow diagram 400 illustrating events and control flow of a dynamically adaptive language understanding system configured in accordance with certain embodiments of the present disclosure. Flow diagram 400 expands on the details presented in flow diagram 200.

Initially, as previously described, the system is shown to be in an adaptation phase 202. During adaptation mode the ASR circuit 106 generates hypotheses 220 for audio events associated with the rejection class. These hypotheses are passed to the adaptation update circuit 308 of the adaptive SLU classifier circuit 110, for use in updating the dynamic semantic models 112b.

When a WOV key-phrase (e.g., "hello computer") is detected by the WOV circuit 102, a trigger 210 is sent to the ASR 106 and the system transitions to query recognition mode 204. The ASR then recognizes the in-domain query (e.g., "turn the light on"). The recognition hypothesis and associated information is passed 231 to the static classifier circuit 302, and also passed 233 to the dynamic classifier circuit 304. These classifiers generate, respectively, a first estimate of intent 410, and a second estimate of intent 420, which are passed to the interpolation circuit 306 for determination of an improved estimate of intent.

The recognition hypothesis and associated information is also passed 232 from the ASR to the adaptation update circuit 308, to further update the dynamic semantic models 112b to improve recognition of in-domain queries and to ensure that the learning process is balanced between this in-domain data and the out-of-domain data provided through transfer 220 described above. The updated models are shared 430 between the adaptation update circuit 308 and the dynamic classifier circuit 304.

The improved estimate of intent is then passed 240 to the control system application 114, as previously described, to perform an action associated with the intent. After the intent is determined, a trigger 250 is sent back to the WOV circuit to restart the search for another key-phrase, and the system transitions back to adaptation mode 202.

Figure 5A:
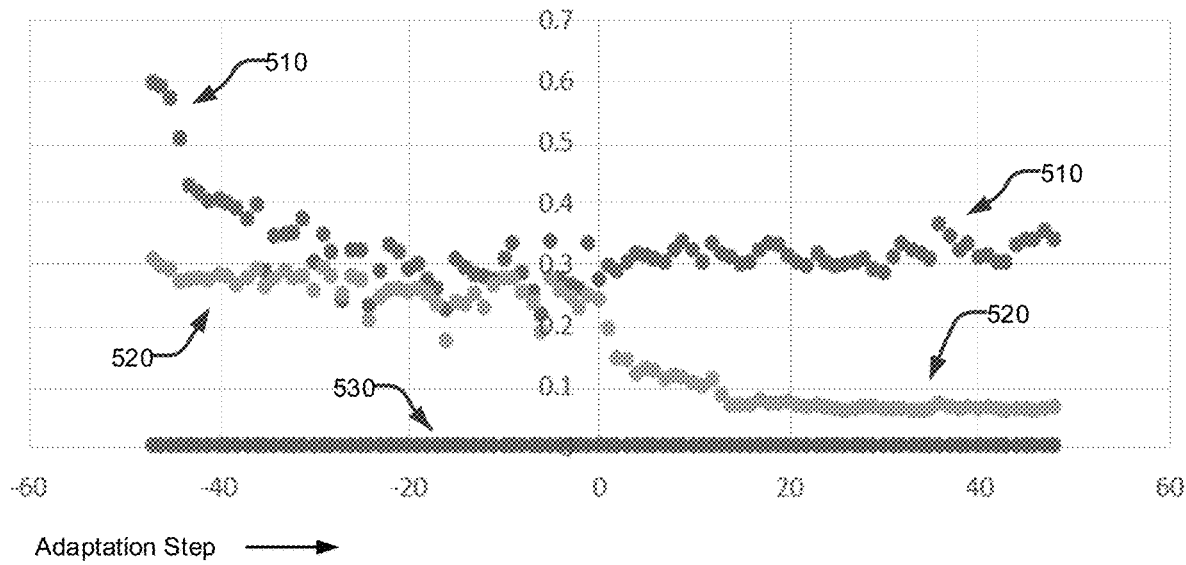
FIGS. 5A and 5B are plots of classification error versus adaptation progress for varying acoustic environments, in accordance with certain embodiments of the present disclosure.
Figure 5B:
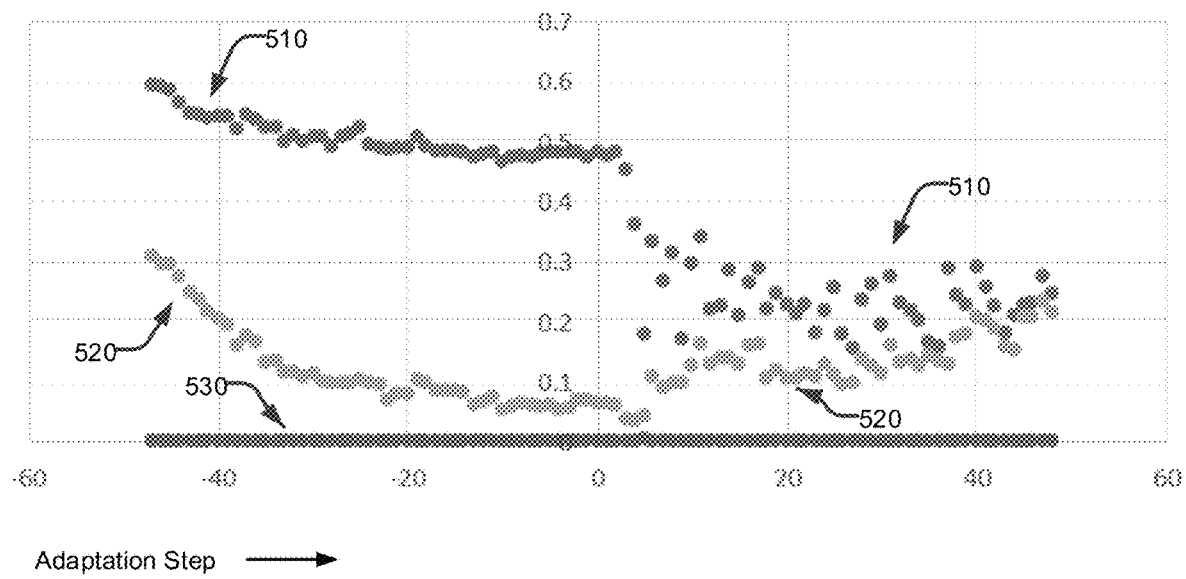

FIGS. 5A and 5B are plots of classification error versus adaptation progress for data sets representing varying acoustic environments, in accordance with certain embodiments of the present disclosure. Data set 510 represents an acoustic environment that includes music and/or singing voices, as would be produced, for example, by a television or radio playing in the background. Data set 520 represents an acoustic environment that includes background conversation and speaker voices which are distinct from queries to be recognized. Thus, data sets 510 and 520 provide out-of-domain signals. In contrast, data set 530 provides in-domain voice queries that are meant to be recognized and acted upon.

Each point in the plot is an evaluation of recognition/classification performance (e.g., during query recognition mode 204) for 1000 utterances of the given data-set. The horizontal axis corresponds to adaptation update steps which are labeled from −48 to 48, where the adaptation data (e.g., the out-of-domain data provided during adaptation mode 202) is switched at adaptation step 0. The vertical axis shows the classification error (e.g., 0.7 corresponds to 70%), and thus a lower error is associated with better performance. The left-most point on the plot is the baseline (e.g., prior to initiating the adaptation process), and it can be seen that classification errors decrease over time due to adaptation.

FIG. 5A shows the results when adaptation is first performed using data set 510 (over steps −48 to 0), and then performed using data set 520 (over steps 0 to +48). As can be seen, the classification error for 510 data decreases while adapting for data set 510 (left half of graph), and then levels off as the adaptation switches to data set 520 (right half of graph). Similarly, the classification error for 520 data remains relatively level while adapting for data set 510 (left half of graph), and decreases as the adaptation switches to data set 520 (right half of graph).

For comparison, FIG. 5B shows the results when the adaptation is reversed, that is to say when adaptation is first performed using data set 520 (over steps −48 to 0), and then performed using data set 510 (over steps 0 to +48). As expected, classification error for 520 data decreases while adapting for data set 520 (left half of graph), and then levels off as the adaptation switches to data set 510 (right half of graph). Similarly, the classification error for 510 data remains relatively level while adapting for data set 520 (left half of graph), and decreases as the adaptation switches to data set 510 (right half of graph).

Both plots, FIGS. 5A and 5B, show limited impact (below 0.02% error) on the in-domain classifications 530. In other words, classification errors of in-domain voice queries remain quite low and are unaffected by the adaptation process, while classification errors of the out-of-domain signals are significantly reduced. These results demonstrate that models which are better trained to the acoustic environment achieve higher classification accuracy resulting in an improved the user's experience. These experiments were run, in both cases, with an influence weight of 0.5 and a learning rate of 0.1.

Methodology

Figure 6:
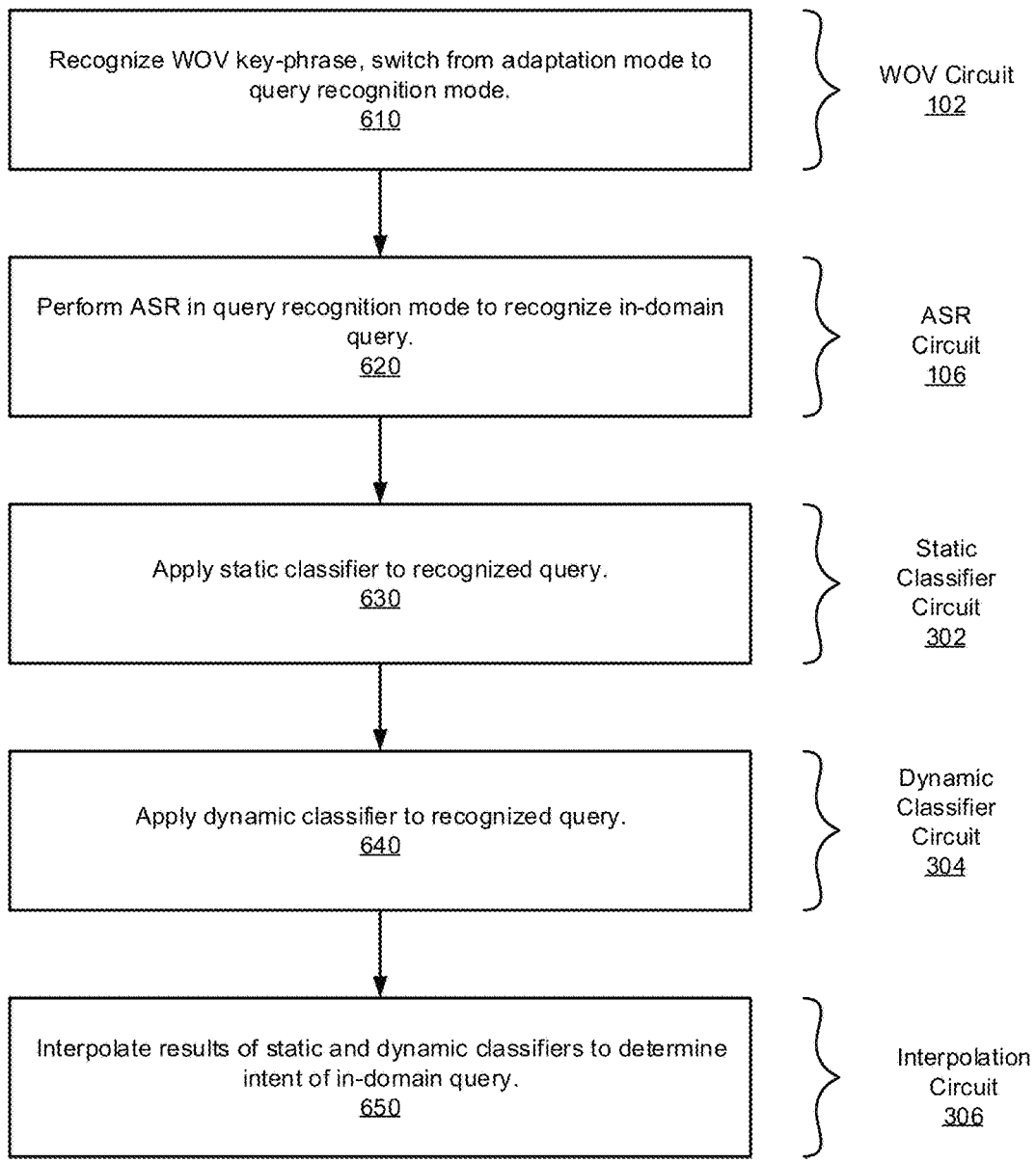
FIG. 6 is a flowchart illustrating a methodology for dynamic adaptation of a language understanding system, in accordance with certain embodiments of the present disclosure.

FIG. 6 is a flowchart illustrating an example method 600 for dynamic adaptation of a language understanding system to an acoustic environment, in accordance with certain embodiments of the present disclosure. As can be seen, the example method includes a number of phases and sub-processes, the sequence of which may vary from one embodiment to another. However, when considered in the aggregate, these phases and sub-processes form a process for dynamic adaptation of a language understanding system, in accordance with certain of the embodiments disclosed herein. These embodiments can be implemented, for example using the system architecture illustrated in FIGS. 1 and 3, as described above. However other system architectures can be used in other embodiments, as will be apparent in light of this disclosure. To this end, the correlation of the various functions shown in FIG. 6 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module having decoupled sub-modules can be used to perform all of the functions of method 600. Thus, other embodiments may have fewer or more modules and/or sub-modules depending on the granularity of implementation. In still other embodiments, the methodology depicted can be implemented as a computer program product including one or more non-transitory machine-readable mediums that when executed by one or more processors cause the methodology to be carried out. Numerous variations and alternative configurations will be apparent in light of this disclosure.

As illustrated in FIG. 6, in an embodiment, method 600 for dynamic adaptation of a language understanding system commences by generating, at operation 610, a trigger in response to recognition of a wake-on-voice key-phrase in an audio stream. The trigger may be used to switch the system processing mode from an adaptation mode to a query recognition mode. Next, at operation 620, automatic speech recognition is performed on the audio stream during the query recognition mode, to recognize an in-domain query.

At operation 630, a static language understanding classifier is applied to the recognized in-domain query. The static language understanding classifier employs a static semantic model. At operation 640, a dynamic language understanding classifier is applied to the recognized in-domain query. The dynamic language understanding classifier employs a dynamic semantic model.

At operation 650, results of the static language understanding classifier are interpolated with results of the dynamic language understanding classifier to determine an intent associated with the recognized in-domain query. In some embodiments, the processing mode may be switched back from the query recognition mode to the adaptation mode in response to determining the intent associated with the recognized in-domain query.

Of course, in some embodiments, additional operations may be performed, as previously described in connection with the system. For example, automatic speech recognition may be performed on the audio stream during the adaptation mode, to generate hypotheses for audio events associated with a rejection class, and the dynamic semantic model may be updated based on the generated hypotheses. The rejection class may include audio associated with out-of-domain utterances and/or background noise. In some embodiments, the dynamic semantic model may also be updated based on the recognized in-domain queries. In some embodiments, the generated hypotheses include an acoustic confidence level, an energy level, a pitch level, and/or prosodic information.

Example System

Figure 7:
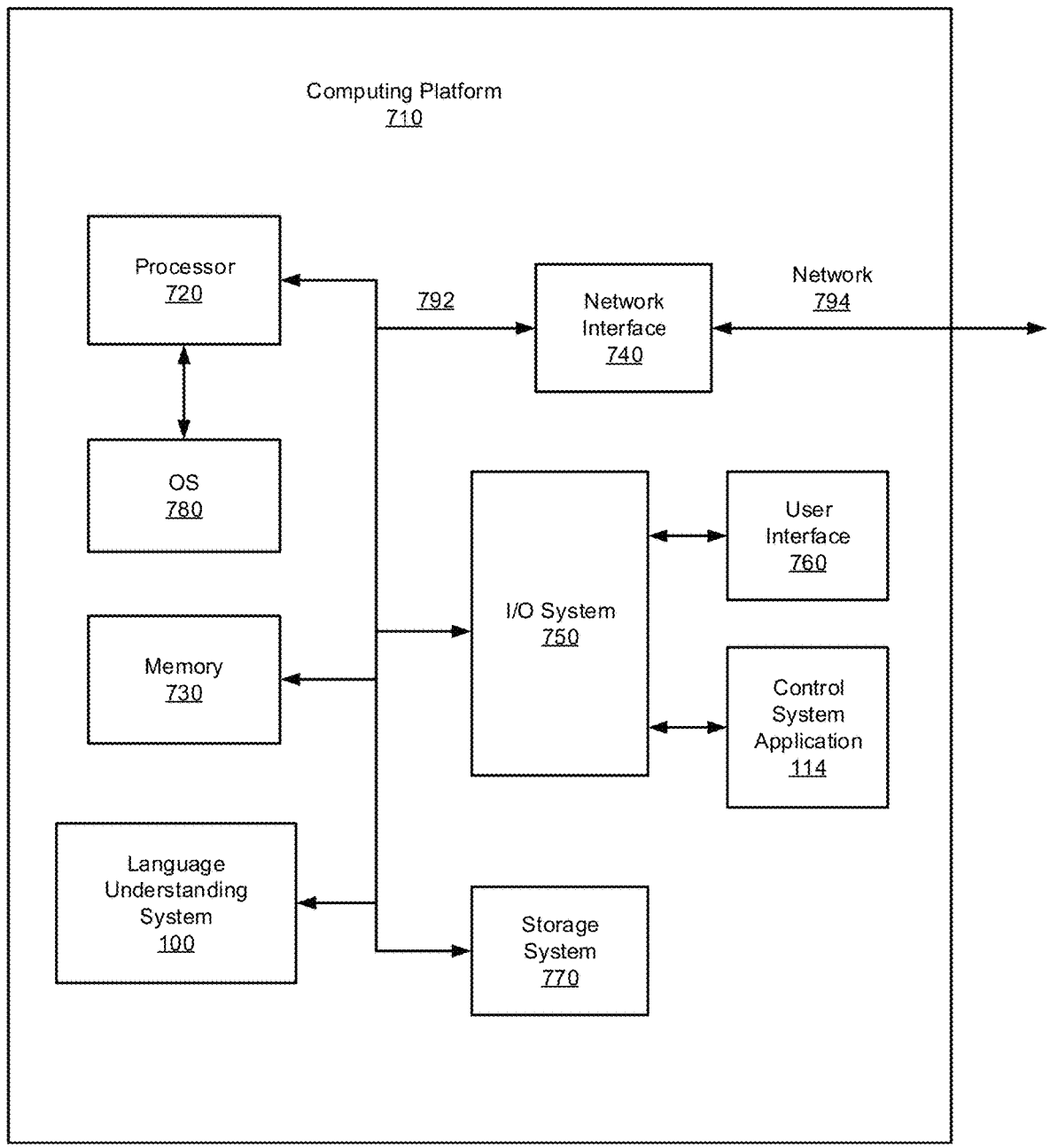
FIG. 7 is a block diagram schematically illustrating a computing platform configured to perform language understanding with dynamic adaptation to acoustic environments, in accordance with certain embodiments of the present disclosure.

FIG. 7 illustrates an example system 700 to perform language understanding with dynamic adaptation to acoustic environments, configured in accordance with certain embodiments of the present disclosure. In some embodiments, system 700 comprises a computing platform 710 which may host, or otherwise be incorporated into a personal computer, workstation, server system, smart home management system, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, wearable device, embedded system, and so forth. Any combination of different devices may be used in certain embodiments.

In some embodiments, platform 710 may comprise any combination of a processor 720, a memory 730, a dynamically adaptive language understanding system 100, a network interface 740, an input/output (I/O) system 750, a user interface 760, a control system application 114, and a storage system 770. As can be further seen, a bus and/or interconnect 792 is also provided to allow for communication between the various components listed above and/or other components not shown. Platform 710 can be coupled to a network 794 through network interface 740 to allow for communications with other computing devices, platforms, devices to be controlled, or other resources. Other componentry and functionality not reflected in the block diagram of FIG. 7 will be apparent in light of this disclosure, and it will be appreciated that other embodiments are not limited to any particular hardware configuration.

Processor 720 can be any suitable processor, and may include one or more coprocessors or controllers, such as an audio processor, a graphics processing unit, or hardware accelerator, to assist in control and processing operations associated with system 700. In some embodiments, the processor 720 may be implemented as any number of processor cores. The processor (or processor cores) may be any type of processor, such as, for example, a microprocessor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 720 may be implemented as a complex instruction set computer (CISC) or a reduced instruction set computer (RISC) processor. In some embodiments, processor 720 may be configured as an x86 instruction set compatible processor.

Memory 730 can be implemented using any suitable type of digital storage including, for example, flash memory and/or random-access memory (RAM). In some embodiments, the memory 730 may include various layers of memory hierarchy and/or memory caches as are known to those of skill in the art. Memory 730 may be implemented as a volatile memory device such as, but not limited to, a RAM, dynamic RAM (DRAM), or static RAM (SRAM) device. Storage system 770 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 770 may comprise technology to increase the storage performance enhanced protection for valuable digital media when multiple hard drives are included.

Processor 720 may be configured to execute an Operating System (OS) 780 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with system 700, and therefore may also be implemented using any suitable existing or subsequently-developed platform.

Network interface circuit 740 can be any appropriate network chip or chipset which allows for wired and/or wireless connection between other components of computer system 700 and/or network 794, thereby enabling system 700 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 750 may be configured to interface between various I/O devices and other components of computer system 700. I/O devices may include, but not be limited to, user interface 760 and control system application 114. User interface 760 may include devices (not shown) such as a microphone (or array of microphones), speaker, display element, touchpad, keyboard, and mouse, etc. I/O system 750 may include a graphics subsystem configured to perform processing of images for rendering on the display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 720 or any chipset of platform 710.

It will be appreciated that in some embodiments, the various components of the system 700 may be combined or integrated in a system-on-a-chip (SoC) architecture. In some embodiments, the components may be hardware components, firmware components, software components or any suitable combination of hardware, firmware or software.

Language understanding system 100 is configured to provide language understanding with dynamic adaptation to acoustic environments for improved intent recognition and response to user commands, as described previously. Language understanding system 100 may include any or all of the circuits/components illustrated in FIGS. 1 and 3, as described above. These components can be implemented or otherwise used in conjunction with a variety of suitable software and/or hardware that is coupled to or that otherwise forms a part of platform 710. These components can additionally or alternatively be implemented or otherwise used in conjunction with user I/O devices that are capable of providing information to, and receiving information and commands from, a user.

In some embodiments, these circuits may be installed local to system 700, as shown in the example embodiment of FIG. 7. Alternatively, system 700 can be implemented in a client-server arrangement wherein at least some functionality associated with these circuits is provided to system 700 using an applet, such as a JavaScript applet, or other downloadable module or set of sub-modules. Such remotely accessible modules or sub-modules can be provisioned in real-time, in response to a request from a client computing system for access to a given server having resources that are of interest to the user of the client computing system. In such embodiments, the server can be local to network 794 or remotely coupled to network 794 by one or more other networks and/or communication channels. In some cases, access to resources on a given network or computing system may require credentials such as usernames, passwords, and/or compliance with any other suitable security mechanism.

In various embodiments, system 700 may be implemented as a wireless system, a wired system, or a combination of both. When implemented as a wireless system, system 700 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 700 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the dynamically adaptive language understanding methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology.

For instance, in certain embodiments, the system may leverage processing resources provided by a remote computer system accessible via network 794. In other embodiments, the functionalities disclosed herein can be incorporated into other speech-based software applications, such as, for example, automobile control/navigation, smart-home management, entertainment, and robotic applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments system 700 may comprise additional, fewer, or alternative subcomponents as compared to those included in the example embodiment of FIG. 7.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

FURTHER EXAMPLE EMBODIMENTS

The following examples pertain to further embodiments, from which numerous permutations and configurations will be apparent.

Example 1 is a processor-implemented method for dynamic adaptation of a language understanding system to acoustic environments, the method comprising: generating, by a processor-based system, a trigger in response to recognition of a wake-on-voice key-phrase in or prior to an audio stream, the trigger to switch a processing mode from an adaptation mode to a query recognition mode; performing, by the processor-based system, automatic speech recognition on the audio stream during the query recognition mode, to recognize an in-domain query; applying, by the processor-based system, a static language understanding classifier to the recognized in-domain query, the static language understanding classifier employing a static semantic model; applying, by the processor-based system, a dynamic language understanding classifier to the recognized in-domain query, the dynamic language understanding classifier employing a dynamic semantic model; and determining, by the processor-based system, an intent associated with the recognized in-domain query based on results of the static language understanding classifier and results of the dynamic language understanding classifier.

Example 2 includes the subject matter of Example 1, further comprising: performing automatic speech recognition on the audio stream during the adaptation mode, to generate hypotheses for audio events associated with a rejection class; and updating the dynamic semantic model based on the generated hypotheses.

Example 3 includes the subject matter of Examples 1 or 2, wherein the rejection class includes audio associated with out-of-domain utterances, or background noise, or both out-of-domain utterances and background noise.

Example 4 includes the subject matter of any of Examples 1-3, wherein the generated hypotheses include one or more of an acoustic confidence level, an energy level, a pitch level, and prosodic information.

Example 5 includes the subject matter of any of Examples 1-4, wherein the updating of the dynamic semantic model further comprises performing a stochastic gradient descent optimization.

Example 6 includes the subject matter of any of Examples 1-5, further comprising updating the dynamic semantic model based on the recognized in-domain query.

Example 7 includes the subject matter of any of Examples 1-6, further comprising switching the processing mode from the query recognition mode to the adaptation mode in response to determining the intent associated with the recognized in-domain query.

Example 8 includes the subject matter of any of Examples 1-7, further comprising restricting the adaptation mode to selected time periods based on a predetermined power budget.

Example 9 includes the subject matter of any of Examples 1-8, wherein determining the intent associated with the recognized in-domain query includes interpolating the results of the static language understanding classifier with the results of the dynamic language understanding classifier to determine the intent associated with the recognized in-domain query.

Example 10 is a language understanding system with dynamic adaptation to acoustic environments, the system comprising: a wake-on-voice circuit to generate a trigger in response to recognition of a wake-on-voice key-phrase in or prior to an audio stream, the trigger to switch a processing mode of the system from an adaptation mode to a query recognition mode; an automatic speech recognition circuit to perform speech recognition on the audio stream during the query recognition mode, to recognize an in-domain query; a static language understanding classifier circuit to generate a first estimate of intent based on the recognized in-domain query, the static language understanding classifier circuit employing a static semantic model; a dynamic language understanding classifier circuit to generate a second estimate of intent based on the recognized in-domain query, the dynamic language understanding classifier employing a dynamic semantic model; and an interpolation circuit to determine an intent associated with the recognized in-domain query based on a combination of the first estimate of intent and the second estimate of intent.

Example 11 includes the subject matter of Example 10, wherein the automatic speech recognition circuit is further to perform speech recognition on the audio stream during the adaptation mode, to generate hypotheses for audio events associated with a rejection class; and wherein the system further comprises on adaptation update circuit to update the dynamic semantic model based on the generated hypotheses.

Example 12 includes the subject matter of Examples 10 or 11, wherein the rejection class includes audio associated with out-of-domain utterances, or background noise, or both out-of-domain utterances and background noise.

Example 13 includes the subject matter of any of Examples 10-12, wherein the generated hypotheses include one or more of an acoustic confidence level, an energy level, a pitch level, and prosodic information.

Example 14 includes the subject matter of any of Examples 10-13, wherein the adaptation update circuit is further to perform a stochastic gradient descent optimization to update the dynamic semantic model.

Example 15 includes the subject matter of any of Examples 10-14, wherein the adaptation update circuit is further to update the dynamic semantic model based on the recognized in-domain query.

Example 16 includes the subject matter of any of Examples 10-15, wherein the interpolation circuit is further to switch the processing mode from the query recognition mode to the adaptation mode in response to determining the intent associated with the recognized query.

Example 17 includes the subject matter of any of Examples 10-16, wherein the adaptation mode is restricted to selected time periods based on a predetermined power budget.

Example 18 is at least one non-transitory computer readable storage medium having instructions encoded thereon that, when executed by one or more processors, cause a process to be carried out for dynamic adaptation of a language understanding system to acoustic environments, the process comprising: generating a trigger in response to recognition of a wake-on-voice key-phrase in or prior to an audio stream, the trigger to switch a processing mode from an adaptation mode to a query recognition mode; performing automatic speech recognition on the audio stream during the query recognition mode, to recognize an in-domain query; applying a static language understanding classifier to the recognized in-domain query, the static language understanding classifier employing a static semantic model; applying a dynamic language understanding classifier to the recognized in-domain query, the dynamic language understanding classifier employing a dynamic semantic model; and determining an intent associated with the recognized in-domain query based on results of the static language understanding classifier and results of the dynamic language understanding classifier.

Example 19 includes the subject matter of Example 18, the process further comprising: performing automatic speech recognition on the audio stream during the adaptation mode, to generate hypotheses for audio events associated with a rejection class; and updating the dynamic semantic model based on the generated hypotheses.

Example 20 includes the subject matter of Examples 18 or 19, wherein the rejection class includes audio associated with out-of-domain utterances, or background noise, or both out-of-domain utterances and background noise.

Example 21 includes the subject matter of any of Examples 18-20, wherein the generated hypotheses include one or more of an acoustic confidence level, an energy level, a pitch level, and prosodic information.

Example 22 includes the subject matter of any of Examples 18-21, wherein the updating of the dynamic semantic model further comprises the operation of performing a stochastic gradient descent optimization based on the recognized in-domain query.

Example 23 includes the subject matter of any of Examples 18-22, the process further comprising switching the processing mode from the query recognition mode to the adaptation mode in response to determining the intent associated with the recognized in-domain query.

Example 24 includes the subject matter of any of Examples 18-23, the process further comprising restricting the adaptation mode to selected time periods based on a predetermined power budget.

Example 25 includes the subject matter of any of Examples 18-24, wherein determining the intent associated with the recognized in-domain query includes interpolating the results of the static language understanding classifier with the results of the dynamic language understanding classifier to determine the intent associated with the recognized in-domain query.

Example 26 is a language understanding system with dynamic adaptation to acoustic environments, the system comprising: means for generating a trigger in response to recognition of a wake-on-voice key-phrase in or prior to an audio stream, the trigger to switch a processing mode from an adaptation mode to a query recognition mode; means for performing automatic speech recognition on the audio stream during the query recognition mode, to recognize an in-domain query; means for applying a static language understanding classifier to the recognized in-domain query, the static language understanding classifier employing a static semantic model; means for applying a dynamic language understanding classifier to the recognized in-domain query, the dynamic language understanding classifier employing a dynamic semantic model; and means for determining an intent associated with the recognized in-domain query based on results of the static language understanding classifier and results of the dynamic language understanding classifier.

Example 27 includes the subject matter of Example 26, further comprising: means for performing automatic speech recognition on the audio stream during the adaptation mode, to generate hypotheses for audio events associated with a rejection class; and means for updating the dynamic semantic model based on the generated hypotheses.

Example 28 includes the subject matter of Examples 26 or 27, wherein the rejection class includes audio associated with out-of-domain utterances, or background noise, or both out-of-domain utterances and background noise.

Example 29 includes the subject matter of any of Examples 26-28, wherein the generated hypotheses include one or more of an acoustic confidence level, an energy level, a pitch level, and prosodic information.

Example 30 includes the subject matter of any of Examples 26-29, wherein the updating of the dynamic semantic model further comprises means for performing a stochastic gradient descent optimization.

Example 31 includes the subject matter of any of Examples 26-30, further comprising means for updating the dynamic semantic model based on the recognized in-domain query.

Example 32 includes the subject matter of any of Examples 26-31, further comprising means for switching the processing mode from the query recognition mode to the adaptation mode in response to determining the intent associated with the recognized in-domain query.

Example 33 includes the subject matter of any of Examples 26-32, further comprising means for restricting the adaptation mode to selected time periods based on a predetermined power budget.

Example 34 includes the subject matter of any of Examples 26-33, wherein determining the intent associated with the recognized in-domain query includes means for interpolating the results of the static language understanding classifier with the results of the dynamic language understanding classifier to determine the intent associated with the recognized in-domain query.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A method for dynamic adaptation of a language understanding system to acoustic environments, the method comprising:
   detecting, by executing instructions with a processor, a wake-on-voice key-phrase in or prior to an audio stream;
   triggering, by executing instructions with the processor, a query recognition mode in response to the detecting of the wake-on-voice key-phrase;
   performing, by executing instructions with the processor, automatic speech recognition on the audio stream to recognize a voice query;
   applying, by executing instructions with the processor, a static language understanding classifier to the voice query, the static language understanding classifier employing a static semantic model;
   applying, by executing instructions with the processor, a dynamic language understanding classifier to the voice query, the dynamic language understanding classifier employing a dynamic semantic model;
   determining, by executing instructions with the processor, an intent associated with the voice query based on a linear interpolation of a first estimate of intent from the static language understanding classifier and a second estimate of intent from the dynamic language understanding classifier, the linear interpolation to combine the first estimate of intent and the second estimate of intent;
   triggering, by executing instructions with the processor; a switch from the query recognition mode to an adaptation mode in response to determining the intent;
   performing, by executing instructions with the processor, automatic speech recognition on the audio stream to generate hypotheses for audio events associated with utterances and background noise; and
   updating, by executing instructions with the processor, the dynamic semantic model based on the hypotheses.

2. The method of claim 1, wherein the generated hypotheses include one or more of an acoustic confidence level, a pitch level, or prosodic information.

3. The method of claim 1, wherein the updating of the dynamic semantic model further includes performing a stochastic gradient descent optimization.

4. The method of claim 1, further including updating the dynamic semantic model based on the voice query.

5. The method of claim 1, wherein determining the intent associated with the recognized voice query is based on a class-constrained interpolation of the first estimate of intent from the static language understanding classifier and the second estimate of intent from the dynamic language understanding classifier.

6. A system comprising:
   a wake-on-voice circuit to:
   detect a wake-on-voice key-phrase in or prior to an audio stream,
   trigger a query recognition mode in response to the detection of the wake-on-voice key-phrase, and
   trigger a switch from the query recognition mode to an adaptation mode in response to determining an intent associated with a voice query;
   an automatic speech recognition circuit to:
   perform speech recognition on the audio stream during the query recognition mode,
   recognize the voice query,
   perform speech recognition on the audio stream during the adaptation mode, and
   generate hypotheses for audio events associated with utterances and background noise;
   a static language understanding classifier circuit to:
   generate a first estimate of intent based on the voice query, and
   employ a static semantic model;
   a dynamic language understanding classifier circuit to:
   generate a second estimate of intent based on the recognized in-domain query, and
   employ a dynamic semantic model;
   an interpolation circuit to determine an intent associated with the voice query based on a linear interpolation of the first estimate of intent from the static language understanding classifier circuit and the second estimate of intent from the dynamic language understanding classifier circuit, the linear interpolation including a combination of the first estimate of intent and the second estimate of intent; and an adaptation circuit to update the dynamic semantic model based on the generated hypotheses.

7. The system of claim 6, wherein the generated hypotheses include one or more of an acoustic confidence level, a pitch level, or prosodic information.

8. The system of claim 6, wherein the adaptation circuit is to perform a stochastic gradient descent optimization to update the dynamic semantic model.

9. The system of claim 6, wherein the adaptation circuit is to update the dynamic semantic model based on the voice query.

10. At least one non-transitory computer readable medium comprising instructions that, when executed, cause one or more processors to at least:

detect a wake-on-voice key-phrase in or prior to an audio stream;

trigger a query recognition mode in response to the detection of the wake-on-voice key-phrase;

perform automatic speech recognition on the audio stream to recognize a voice query;

apply a static language understanding classifier to the voice query, the static language understanding classifier to employ a static semantic model;

apply a dynamic language understanding classifier to the voice query, the dynamic language understanding classifier to employ a dynamic semantic model;

determine an intent associated with the voice query based on a linear interpolation of a first estimate of intent from the static language understanding classifier and a second estimate of intent from the dynamic language understanding classifier, the linear interpolation to combine the first estimate of intent and the second estimate of intent;

trigger a switch from the query recognition mode to an adaptation mode in response to determining the intent;

perform automatic speech recognition on the audio stream during the adaptation mode, to generate hypotheses for audio events associated with a rejection class that includes audio associated with out-of-domain utterances; and update the dynamic semantic model based on the hypotheses.

11. The at least one non-transitory computer readable medium of claim 10, wherein the generated hypotheses include one or more of an acoustic confidence level, a pitch level, or prosodic information.

12. The at least one non-transitory computer readable medium of claim 10, wherein the updating of the dynamic semantic model includes performing a stochastic gradient descent optimization based on the voice query.

13. The at least one non-transitory computer readable medium of claim 10, wherein the instructions, when executed, cause the one or more processors to determine the intent associated with the voice query based on a class-constrained interpolation of the first estimate of intent from the static language understanding classifier and the second estimate of intent from the dynamic language understanding classifier.

14. The method of claim 1, further including utilizing an influence weight in the linear interpolation to control an effect of the static language understanding classifier and the dynamic language understanding classifier on the intent.

15. The method of claim 5, further including limiting the updating of the dynamic semantic model based on outlier cases including at least one of high-noise environments or semantic classes.

16. The system of claim 6, wherein the interpolation circuit is to utilize an influence weight in the linear interpolation to control an effect of the static language understanding classifier and the dynamic language understanding classifier on the intent.

17. The system of claim 6, wherein the interpolation circuit is to determine the intent associated with the voice query is based on a class-constrained interpolation of the first estimate of intent from the static language understanding classifier and the second estimate of intent from the dynamic language understanding classifier.

18. The system of claim 17, wherein the adaptation circuit is to limit updating the dynamic semantic model to outlier cases including at least one of high-noise environments or semantic classes.

19. The at least one non-transitory computer readable medium of claim 10, wherein the instructions, when executed, cause the one or more processors to utilize an influence weight in the linear interpolation to control an effect of the static language understanding classifier and the dynamic language understanding classifier on the intent.

20. The at least one non-transitory computer readable medium of claim 13, wherein the instructions, when executed, cause the one or more processors to limit updating of the dynamic semantic model to outlier cases including at least one of high-noise environments or semantic classes.

21. The at least one non-transitory computer readable medium of claim 10, wherein the instructions, when executed, cause the one or more processors to update the dynamic semantic model based on the voice query.

22. The at least one non-transitory computer readable medium of claim 10, wherein the instructions, when executed, cause the one or more processors to use a first learning rate with the dynamic semantic model for a first environment and a second learning rate with the dynamic semantic model for a second environment, the first environment changing faster than the second environment, the first learning rate higher than the second learning rate.

* * * * *